United States Patent
Wulbrecht

[11] 3,748,477
[45] July 24, 1973

[54] CUSHION FOLD
[75] Inventor: Robert M. Wulbrecht, Utica, Mich.
[73] Assignee: Allied Chemical Corporation, New York, N.Y.
[22] Filed: Sept. 22, 1971
[21] Appl. No.: 182,794

[52] U.S. Cl. ............ 280/150 AB, 182/137, 244/121
[51] Int. Cl. ............................................. B60n 21/08
[58] Field of Search ............... 280/150 AB; 182/137

[56] References Cited
UNITED STATES PATENTS

| | | | |
|---|---|---|---|
| 3,473,824 | 10/1969 | Carey et al. | 280/150 AB |
| 3,591,201 | 7/1971 | Brawn et al. | 280/150 AB |
| 3,638,755 | 2/1972 | Sack | 280/150 AB |
| 3,618,977 | 11/1971 | Kloue, Jr. et al. | 280/150 AB |
| 3,640,546 | 2/1972 | Brawn | 280/150 AB |
| 3,666,289 | 5/1972 | Magyar | 280/150 AB |

*Primary Examiner*—Kenneth H. Betts
*Assistant Examiner*—John P. Silverstrim
*Attorney*—Jonathan Plaut

[57] ABSTRACT

Folding of air cushion restraint means so that the cushion absorbs energy and is controlled in its deployment, the mass thereof first coming in contact with the occupant being minimized.

4 Claims, 4 Drawing Figures

PATENTED JUL 24 1973 3,748,477

INVENTOR.
ROBERT M. WULBRECHT
BY:
ATTORNEY.

CUSHION FOLD

This invention relates to energy absorption in a passenger restraint system as a result of the folding and positioning before use of an energy-absorbing cushion or bag. Particularly, the energy-absorbing elastic cushion as folded and inflated because of such folding acts to dissipate and direct the total amount of energy of the fluid material which inflates the passenger restraint air cushion.

In the case of gas cushion inflation on impact of the motor vehicle, injury may be caused under some circumstances to the occupants due to the relatively large magnitude of momentum imparted against the occupant by the rapidly inflating gas cushion, if the full mass of the cushion is directed or rides upwardly rapidly towards the head of the occupant. This is especially significant when the occupant is a child and may, in fact, be standing at the time of impact. If the cushion inflates and rides upon the child so as to strike his head with a large mass of the bag, for example, serious injury may result. In this situation, a direction of the cushion away from the occupant's head, together with effective energy absorption and the lessening of mass striking the occupant, results in a safer disposition of the cushion in the car. This is all particularly useful in the case of a standing child in the right front passenger seat (a child standing on the floor in front of the dash panel) or in the case of an occupant not seated in the normal position.

Objects and advantages of the invention will become apparent in the context of the following more detailed description of the invention.

BRIEF DESCRIPTION OF THE INVENTION

Generally, energy-absorbing and directing means are provided as a part of a passenger restraint cushion, typically to be found within an automobile. The energy-absorbing and directing property in the cushion restraint is obtained from the folding of the cushion in its dispostion in the automobile before inflation. That fold allows for a part of the cushion to form a compartment or bubble above the inflating cushion, and while absorbing energy it will control the direction of the inflating medium to keep it from moving in upward direction toward the head of occupant, for example. However, the separate compartment or bubble is an integral part of the cushion in the preferred embodiment and achieved as a result of the folding of the cushion, as will be described in the more detailed disclosure. The passenger or driver restraining cushion may be porous so that gas entering into it will be emitted therethrough, and it may also be elastic. The absorption of energy by bubble or compartment, as a result of its pressure on the energy entering into the restraining cushion, serves to dissipate the total amount of said energy over a period of time (and reduces the peak decibel level of said energy) and serves to decrease the mass of the frontal surface of the bag which initially comes in contact with the occupant in its restraining.

Alternately, in one embodiment, the energy-absorbing and directing bubble or compartment may be in the form of separate elastic or non-elastic pocket stitched or otherwise attached to the cushion.

BRIEF DESCRIPTION OF THE DRAWINGS

The instant invention may be better understood with reference to the following drawings of which.

DETAILED DESCRIPTION OF THE INVENTION

Figure 1:
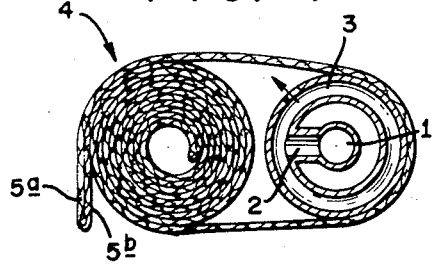
FIG. 1 shows the embodiment of the invention in a folded, ready position.

Turning to FIG. 1, an inflating medium is obtained from a source 1, as is well known in the art. For example, the inflating medium is gas obtained from either a gas generator system or a compressed gas source, or a combination of the two. The inflating medium is directed, at least partially, into a restraining cushioning means, generally indicated at 4. Preferably, communication between the source 1 and the cushioning means 4 is provided by conduit means 2 and manifold means 3. The cushioning means 4 comprises an inflatable bag folded up into a plurality of layers. However, in the instant invention, instead of each layer being inflated consecutively, the top layer formed by layers 5a and 5b are inflated prior to layers physically closer to the inflating medium, in this case the manifold means 3. This results in the formation of restraining means which is best illustrated in FIG. 2.

Figure 2:
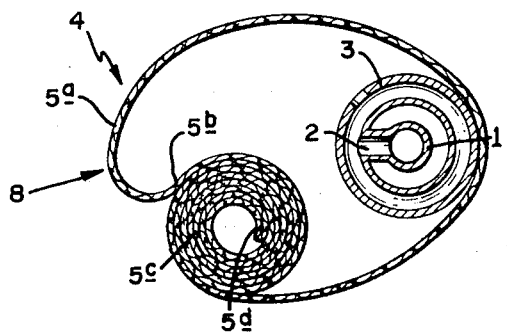
FIG. 2 shows the same embodiment of the invention partly deployed.

In FIG. 2, the cushioning means 4 is shown partially inflated. The folded layers 5a and 5b partially inflated form a bubble, which acts as a restraining means on the remaining inflating folded layers, such as those illustrated at 5c and 5d. It should be understood that the inflation of the layers, such as 5c and 5d, is not retarded. Rather the layers 5c and 5d are fully inflated but instead of inflating upwardly, the inflation in the upward direction is restrained by the restraining effect of the inflating layers 5a and 5b. These layers form a bubble 8 which acts as a restraining means to keep the inflated cushioning means 4 moving in the desired direction, without sudden upward movement, and which acts as a smaller frontal mass of the cushion to decrease the mass first moving into contact with the occupant, since the bubble itself first comes in contact with the occupant.

Figure 3:
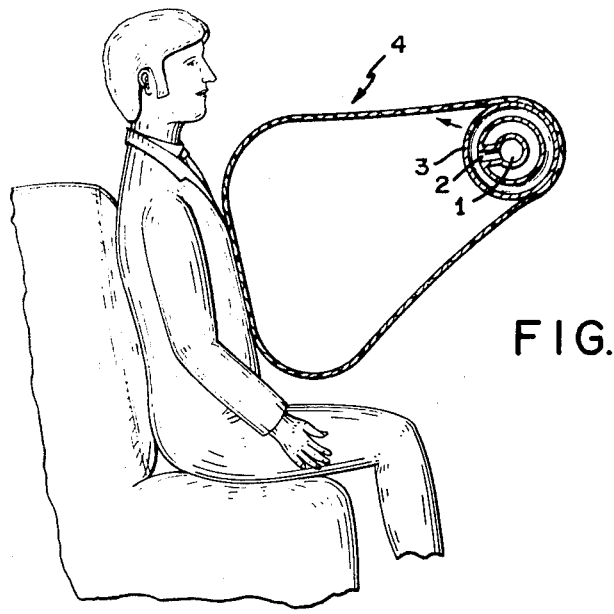
FIG. 3 is the same embodiment of the invention fully deployed.

The formation of a restraining means, preferably the bubble 8, is a transitory phenomena. Upon full inflation of the cushioning means 4, the bubble 8 disappears, see FIG. 3. The cushioning means 4 is entirely without structure, such as a burstable wall, in its interior and is thus internally unoccupied. Inflating gas may thus enter directly into the restraining means without interference thereto.

Figure 4:
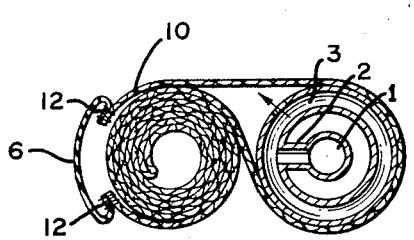
FIG. 4 shows a second embodiment of the invention.

In another preferred embodiment illustrated in FIG. 4, a cushioning means 10 has attached thereto, as by stitching 12, a separate pocket 6, preferably elastic, which acts as an elastic restraint, similar to the bubble of the cushioning means 4 in FIG. 2, to absorb and restrain energy from being directed upwards, in a like manner, as described above.

Of course, this invention is not concerned with the use of a lower torso restraint, which also may be employed within the cushioning means as a matter of choice.

Although the invention has been described with relation to three embodiments, it is understood that the invention is that it only be limited by the scope of the following claims and not the details of the apparatus, materials, or methods of employing them as recited above.

I claim:

1. A gas cushioning restraint system comprising an internally unoccupied energy absorbing and directing restraining cushioning means including a restraining section permanently attached thereto and means for introducing inflating gas directly into said cushioning means, said restraining section comprising a bubble existent when said cushioning means is partially inflated, said bubble located on the upper surface of cushioning means, said cushion folded when uninflated, said bubble created from a part of the fold of the cushion, said bubble disappearing on full inflation, whereby said restraining section fills during inflation and directs expansion of said cushioning means in a controlled manner and decreases the frontal mass of the cushion, as well as absorbing energy of the inflating gas.

2. Gas cushion restraint system of claim 1, said bubble being separate from the cushion and sewn thereto.

3. Gas cushion restraint system of claim 2, said restraint being stitched on said upper surface of said cushion.

4. Gas cushion restraint system of claim 2, said cushion and said restraining section being formed of nylon.

* * * * *